US007983974B2

(12) United States Patent
Keyes et al.

(10) Patent No.: US 7,983,974 B2
(45) Date of Patent: Jul. 19, 2011

(54) SNAPSHOT APPROACH FOR UNDERWRITING VALUATION OF ASSET PORTFOLIOS

(75) Inventors: Tim Kerry Keyes, West Redding, CT (US); Murat Doganaksoy, Stamford, CT (US)

(73) Assignee: GE Corporate Finanical Services, Inc., Norwalk, CT (US)

( * ) Notice: Subject to any disclaimer, the term of this patent is extended or adjusted under 35 U.S.C. 154(b) by 1182 days.

(21) Appl. No.: 10/219,131

(22) Filed: Aug. 14, 2002

(65) Prior Publication Data

US 2004/0034586 A1 Feb. 19, 2004

(51) Int. Cl.
*G06Q 40/00* (2006.01)

(52) U.S. Cl. .................................................... 705/36 R

(58) Field of Classification Search ..................... 705/37
See application file for complete search history.

(56) References Cited

U.S. PATENT DOCUMENTS

| | | | | | |
|---|---|---|---|---|---|
| 4,334,270 | A | * | 6/1982 | Towers ........................ | 705/36 R |
| 5,812,988 | A | | 9/1998 | Sandretto | |
| 5,930,774 | A | | 7/1999 | Chennault | |
| 6,061,662 | A | | 5/2000 | Makivic | |
| 6,173,276 | B1 | | 1/2001 | Kant et al. | |
| 6,275,807 | B1 | | 8/2001 | Schirripa | |
| 6,336,103 | B1 | | 1/2002 | Baker | |
| 6,360,210 | B1 | | 3/2002 | Wallman | |
| 6,381,586 | B1 | | 4/2002 | Glasserman et al. | |
| 6,418,417 | B1 | | 7/2002 | Corby et al. | |
| 7,003,484 | B2 | * | 2/2006 | Keyes et al. ................. | 705/36 R |
| 7,096,197 | B2 | * | 8/2006 | Messmer et al. ............... | 705/37 |
| 2001/0037278 | A1 | * | 11/2001 | Messmer et al. ............... | 705/37 |
| 2002/0184126 | A1 | * | 12/2002 | McIntyre et al. .............. | 705/35 |

OTHER PUBLICATIONS

J.Aubin and G.Haddad, History Path Dependent Optimal Control and Portfolio Valuation and Management, Sep. 2002, Birkhauser Basel, Positivity, vol. 6 No. 3, pp. 331-358.*
P. Carr and R. Jarrow, The stop-loss start-gain paradox and option valuation, The review of Financial Studies, vol. 3 No. 3 (1990), pp. 469-492.*
Simple Criteria for Optimal Portfolio Selection: Tracing Out the Efficient Frontier Edwin J. Elton, Martin J. Gruber and Manfred W. Padberg The Journal of Finance, vol. 33, No. 1 (Mar. 1978), pp. 296-302 Published by: Blackwell Publishing for the American Finance Association.*
Buhlmann, The Valuation Portfolio, Heft Jan. 2007.*
www. merchantportfolios.com, Snapshot Valuation (portfolio only), 2007-2011.*
Yu, Shaw, On the valuation of derivatives with snapshot reset features, Aug. 24 2007.*
Taiwan IPO Search Report dated Oct. 22, 2009; Taiwan Invention Patent Application No. 92121289 (1 page).

* cited by examiner

*Primary Examiner* — Alexander Kalinowski
*Assistant Examiner* — Chuks Onyezia
(74) *Attorney, Agent, or Firm* — Armstrong Teasdale LLP

(57) ABSTRACT

A method for valuing portfolio assets using a snapshot approach system is provided. The method includes segmenting portfolio assets into a predetermined number of segments based on financial attributes of each asset, selecting a representative sample of assets from each segment, valuing each asset in the representative asset sample, and calculating a value of the portfolio assets for bidding purposes based on the value of each asset in the representative asset sample.

52 Claims, 4 Drawing Sheets

SNAPSHOT APPROACH FOR UNDERWRITING VALUATION OF ASSET PORTFOLIOS

BACKGROUND OF THE INVENTION

This invention relates generally to valuation methods for financial instruments, and more particularly to analyzing portfolios of financial assets for the purpose of bidding to acquire those assets.

A large number of assets such as loans, e.g., thousands of loans or other financial instruments, sometimes become available for sale due to economic conditions, the planned or unplanned divestiture of assets or as the result of legal remedies. The sale of thousands of commercial assets or other financial instruments sometimes involving the equivalent of billions of dollars in assets must sometimes occur within a calendar month or less. Of course, the seller of assets wants to optimize the value of the portfolio, and will sometimes group the assets in "tranches." The term "tranche" as used herein is not limited to foreign notes but also includes assets and financial instrument groupings regardless of country or jurisdiction.

Bidders may submit bids on all tranches, or on only some tranches. In order to win a tranche bid, a bidder typically must submit the highest bid for that tranche. In connection with determining a bid amount to submit on a particular tranche, a bidder often will perform due diligence, including engaging underwriters to evaluate judiciously selected assets within a tranche and within the available limited time. In at least some known cases, the remainder of the assets within a tranche are given an estimated underwritten value with the underwritten assets used as a basis.

As a result of this process, a bidder may significantly undervalue a tranche and submit a bid that is not competitive or bid higher than the underwritten value and assume unquantified risk. Since the objective is to win each tranche at a price that enables a bidder to earn a return, losing a tranche due to significant undervaluation of the tranche represents a lost opportunity.

Currently, business enterprises assess an acquisition or sale of assets and portfolios of assets on rapid schedules and often at great distances and varying time zones from the general management teams and functional heads which typically approve the offers for purchase or sale of these assets. Employees, partners and collaborators associated with due diligence regarding the purchase of the assets are typically brought together for a relatively short duration of time to accomplish the due diligence. Typically due diligence activities are conducted in physical proximity to the sources of information associated with the assets. In at least some known cases, the collaborating personnel do not have the benefit of training or knowledge of the complete set of analytical tools at their disposal nor do they have "best practices" from previous efforts of a similar nature.

Consolidation of employees and collaborators into a remote physical location for the duration of the due diligence effort is time consuming and expensive. In addition, persons on due diligence teams rely on a small subset of other personnel who have detailed information about information sources, underwriting, analytical tools, reports, and completed analysis. The subset of individuals who have the information become bottlenecks within a due diligence time line, driving up due diligence costs and adding time that could have otherwise been invested in more value added due diligence.

In summary, there are several factors that typically prevent a substantive analysis on portfolios of financial assets. Some of these factors include incomplete information, limited time to bid date, alternative possible dispositions or resolutions of each asset, expense associated with gathering information, issues related to underwriting and legal, variation of expected assets resolution, uncertain future expenses related to collection on assets, large number of assets in a portfolio and model development for financial analysis.

BRIEF DESCRIPTION OF THE INVENTION

In one aspect, a method for valuing portfolio assets using a snapshot approach system is provided. The method includes segmenting portfolio assets into a predetermined number of segments based on financial attributes of each asset, selecting a representative sample of assets from each segment, valuing each asset in the representative asset sample, and calculating a value of the portfolio assets for bidding purposes based on the value of each asset in the representative asset sample.

In another aspect, a method for valuing portfolio assets using a snapshot approach system is provided. The method includes segmenting portfolio assets into a predetermined number of segments based on financial attributes of each asset, selecting a representative sample of assets from each segment, performing an iterative and adaptive valuation in which each asset in the representative asset sample is individually valued, and valuing the portfolio assets for bidding purposes when a stopping criteria is satisfied by comparing the asset characteristics of the assets in the representative asset sample to the portfolio assets and extrapolating the value of the portfolio assets from the value of each asset in the representative asset sample. The iterative and adaptive valuation includes underwriting each asset in the representative asset sample to generate underwriting data, valuing each asset in the representative asset sample based on underwriting data, segmenting each asset in the representative asset sample based on asset characteristics such that each asset in the representative asset sample is categorized with assets included in the representative asset sample having similar asset characteristics, and applying the stopping criteria.

In another aspect, a portfolio valuation system for snapshot valuation of portfolio assets is provided. The system includes a centralized database for storing information relating to portfolio assets, a server system coupled to the database and configured to perform valuation process analytics, and at least one client system connected to the server system through a network. The server is further configured to segment portfolio assets into a predetermined number of segments based on financial attributes of each asset, select a representative sample of assets from each segment, value each asset in the representative asset sample, and calculate a value of the portfolio assets for bidding purposes based on the value of each asset in the representative asset sample.

In another aspect, a portfolio valuation system for snapshot valuation of portfolio assets is provided. The system includes a centralized database for storing information relating to portfolio assets, a server system coupled to the database and configured to perform valuation process analytics, and at least one client system connected to the server system through a network. The server is further configured to segment portfolio assets into a predetermined number of segments based on financial attributes of each asset, select a representative sample of assets from each segment, perform an iterative and adaptive valuation in which each asset in the representative asset sample is individually valued, and value the portfolio assets for bidding purposes when a stopping criteria is satisfied by comparing asset characteristics of the assets in the representative asset sample to the portfolio assets and extrapolating the value of the portfolio assets from the value of each asset in the representative asset sample. The iterative and adaptive valuation includes underwriting each asset in the representative asset sample to generate underwriting data, valuing each asset in the representative asset sample based on underwriting data, segmenting each asset in the representative asset sample based on asset characteristics such that each asset in the representative asset sample is categorized with assets included in the representative asset sample having similar asset characteristics, and applying the stopping criteria.

In another aspect, a computer for snapshot valuation of portfolio assets is provided. The computer includes a database of portfolio assets and is configured to enable valuation process analytics. The computer is programmed to segment portfolio assets into a predetermined number of segments based on financial attributes of each asset, select a representative sample of assets from each segment, value each asset in the representative asset sample, and calculate a value of the portfolio assets for bidding purposes based on the value of each asset in the representative asset sample.

In another aspect, a computer for snapshot valuation of portfolio assets is provided. The computer includes a database of portfolio assets and is configured to enable valuation process analytics. The computer is programmed to segment portfolio assets into a predetermined number of segments based on financial attributes of each asset, select a representative sample of assets from each segment, perform an iterative and adaptive valuation in which each asset in the representative asset sample is individually valued, and value the portfolio assets for bidding purposes when a stopping criteria is satisfied by comparing asset characteristics of the assets in the representative asset sample to the portfolio assets and extrapolating the value of the portfolio assets from the value of each asset in the representative asset sample. The iterative and adaptive valuation includes underwriting each asset in the representative asset sample to generate underwriting data, valuing each asset in the representative asset sample based on underwriting data, segmenting each asset in the representative asset sample based on asset characteristics such that each asset in the representative asset sample is categorized with assets included in the representative asset sample having similar asset characteristics, and applying the stopping criteria.

In another aspect, a computer program embodied on a computer readable medium for performing snapshot valuation of portfolio assets is provided. The computer program includes computer code that segments portfolio assets into a predetermined number of segments based on financial attributes of each asset, selects a representative sample of assets from each segment, values each asset in the representative asset sample, and calculates a value of the portfolio assets for bidding purposes based on the value of each asset in the representative asset sample.

In another aspect, a computer program embodied on a computer readable medium for performing snapshot valuation of portfolio assets is provided. The computer program includes computer code that segments portfolio assets into a predetermined number of segments based on financial attributes of each asset, selects a representative sample of assets from each segment, performs an iterative and adaptive valuation in which each asset in the representative asset sample is individually valued, and values the portfolio assets for bidding purposes when a stopping criteria is satisfied by comparing asset characteristics of the assets in the representative asset sample to the portfolio assets and extrapolating the value of the portfolio assets from the value of each asset in the representative asset sample. The iterative and adaptive valuation includes underwriting each asset in the representative asset sample to generate underwriting data, valuing each asset in the representative asset sample based on underwriting data, segmenting each asset in the representative asset sample based on asset characteristics such that each asset in the representative asset sample is categorized with assets included in the representative asset sample having similar asset characteristics, and applying the stopping criteria.

DETAILED DESCRIPTION OF THE INVENTION

Figure 1:
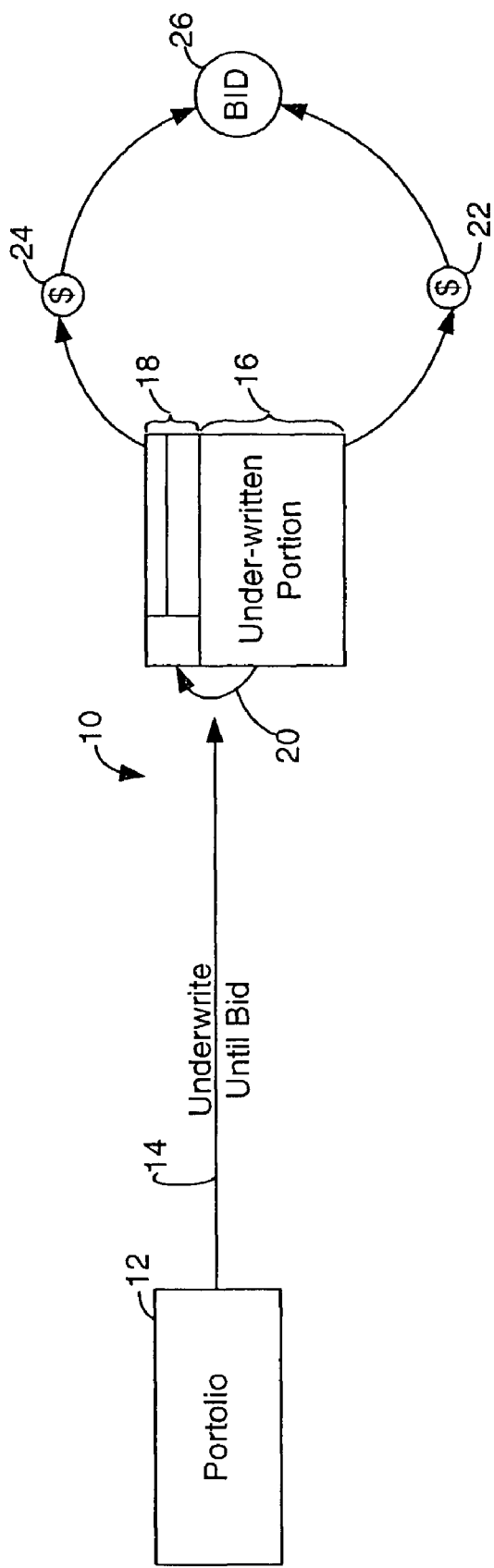
FIG. 1 is a flow diagram illustrating a known process for valuing a portfolio of assets.

FIG. 1 is a diagram 10 illustrating a known process for valuing a large portfolio of assets 12 through an underwriting cycle and through to making a bid for purchasing asset portfolio 12, for example, in an auction. FIG. 1 is a high level overview of a typical underwriting and extrapolation process 10 which is not iterative and not automated. In diagram 10, underwriters underwrite 14 a number of individual assets from portfolio 12 to generate an underwritten first portion 16 and an untouched remainder portion 18. Before any of the assets are underwritten, first portion 16 is zero percent and remainder portion 18 is one hundred percent of portfolio 12. As the underwriting process progresses, first portion 16 increases and remainder portion 18 decreases. The objective is to underwrite as many assets as possible before a bid is submitted for the purchase of asset portfolio. The team of underwriters continues individually underwriting 14 until just before a bid must be submitted. A gross extrapolation 20 is made to evaluate remainder portion 18. The extrapolated value 20 becomes the non-underwritten inferred value 24. The gross extrapolation generates a valuation 24 for remainder portion 18. Valuation 22 is simply the total of the individual asset values in first portion 16. However, valuation 24 is a group valuation generated by extrapolation and may be discounted accordingly. Valuations 22 and 24 are then totaled to produce the portfolio asset value 26. Valuation processes are performed on each tranche of the portfolio.

Figure 2:
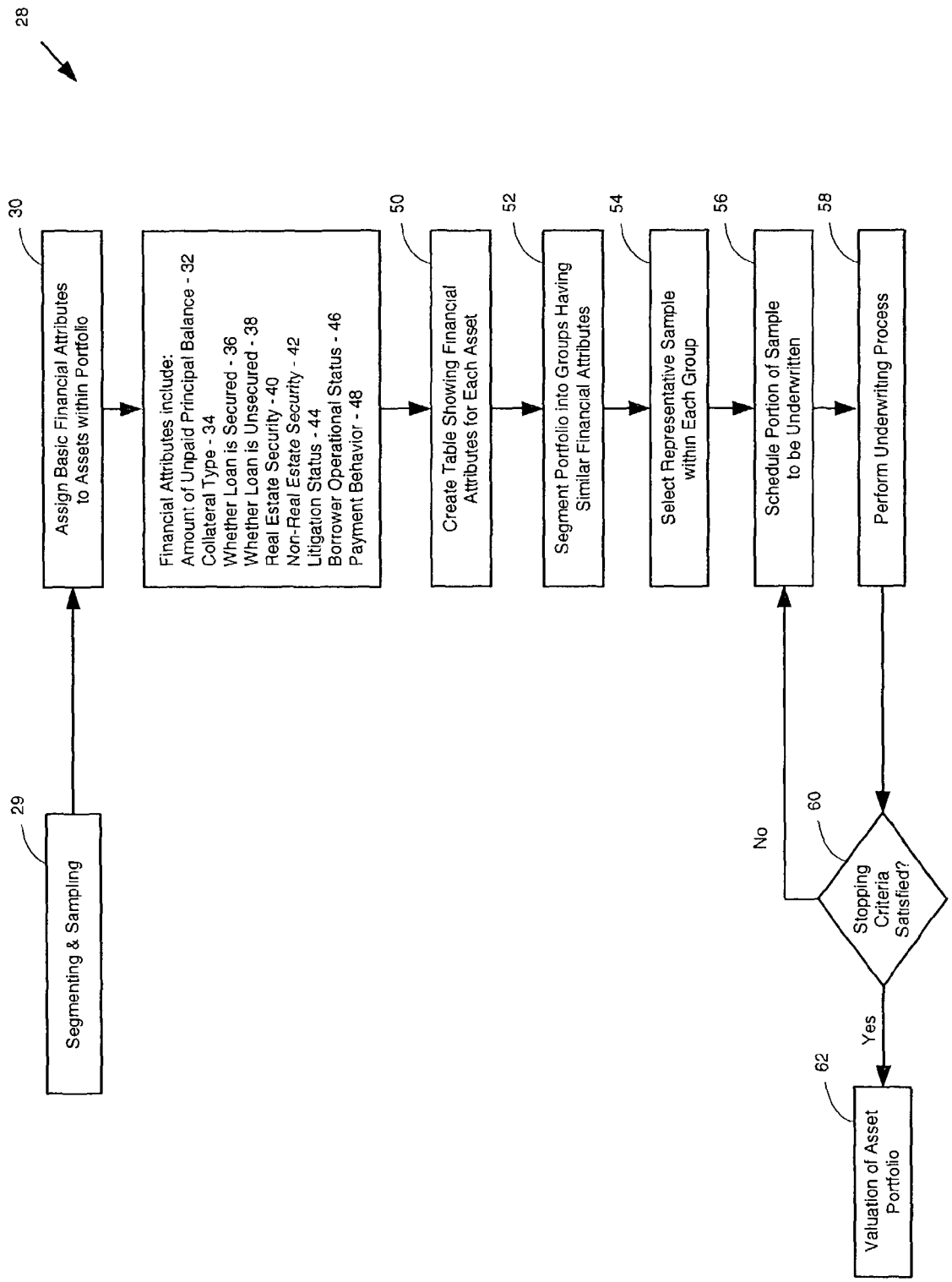
FIG. 2 is a flow diagram illustrating segmenting and sampling a portfolio of assets in accordance with one embodiment of the present invention.

FIG. 2 is a diagram illustrating one embodiment of a system 28 for asset segmenting and sampling 29 utilized in a snapshot approach for valuing an asset portfolio. The term "snapshot approach" as used herein refers to the feature of the present invention that includes selecting a representative sample (i.e., a snapshot) of assets from a portfolio of assets such that the representative sample can be valued and then used to calculate the value of the assets within the asset portfolio.

Included in FIG. 2 are representations of process steps taken by system 28 in segmenting and sampling 29 asset portfolio 12 (shown in FIG. 1). System 28 is a phased approach that assigns certain basic financial attributes 30 to each asset within asset portfolio 12. Financial attributes 30 include, but are not limited to, amount of unpaid principal balance ("UPB") 32, collateral type 34, whether the loan is secured 36, whether the loan is unsecured 38, real estate security 40, non-real estate security 42, litigation status 44, borrower operational status 46, and payment behavior 48. Once each asset within asset portfolio 12 is assigned financial attributes 30, a table 50 is created illustrating this information for each asset. An exemplary embodiment of table 50 is shown below.

|         |                         | Operational Status |              |
|---------|-------------------------|--------------------|--------------|
| UPB_Bin | Security Profile        | Operating          | Non Operating |
| A       | Real Estate Secured     |                    |              |
|         | Non Real Estate Secured |                    |              |
|         | Unsecured               |                    |              |
| B       | Real Estate Secured     |                    |              |
|         | Non Real Estate Secured |                    |              |
|         | Unsecured               |                    |              |
| C       | Real Estate Secured     |                    |              |
|         | Non Real Estate Secured |                    |              |
|         | Unsecured               |                    |              |
| D       | Real Estate Secured     |                    |              |
|         | Non Real Estate Secured |                    |              |
|         | Unsecured               |                    |              |
| E       | Real Estate Secured     |                    |              |
|         | Non Real Estate Secured |                    |              |
|         | Unsecured               |                    |              |

After each asset within asset portfolio 12 is assigned financial attributes 30 and table 50 is created, asset portfolio 12 undergoes a segmentation process 52 wherein each asset within asset portfolio 12 is placed in a group or "segment" based on its assigned financial attributes 30. In other words, the assets within asset portfolio 12 that have similarly assigned financial attributes 30 are grouped into a selected number of segments. Thus, each segment contains assets from asset portfolio 12 that have similar financial attributes 30.

Following segmentation 52, a sampling 54 of the assets within asset portfolio 12 is taken. Sampling 54 includes a representative sample of assets from each segment within asset portfolio 12. In the exemplary embodiment, sampling 54 is a stratified random sampling of assets within asset portfolio 12 taken from each segment. Sampling 54 includes a selected percentage of the assets within asset portfolio 12. For example, sampling 54 might include 25% by UPB of the assets included within asset portfolio 12. Once sampling 54 is completed, the assets selected by sampling 54 are placed in a "sampled" asset portfolio 56, which is a representative subset of asset portfolio 12. Sampled asset portfolio 56 then undergoes the underwriting process 58 as described in greater detail below.

A technical effect produced by the system, which is described in greater detail below, is that a business entity engaged in the business of analyzing portfolios of financial assets for the purpose of bidding to acquire those assets may more quickly and more accurately generate a bid to acquire those assets. The business entity achieves this technical effect by first analyzing and underwriting a representative sample of the assets within the portfolio, and then applying a statistical analysis to predict the values of the other assets within the portfolio. This process is iterated until an acceptable stopping criteria 60 is satisfied. When stopping criteria 60 is satisfied, asset portfolio 12 can be valued 62.

In the example embodiment, stopping criteria 60 includes a known statistic employed in regression analysis that is referred to as an "R-Squared" calculation. "R-Squared" is a statistic employed in regression analysis that measures how much variance has been explained by the regression model. It is a measure of how well the approximation matches the actual data. More specifically, it is the proportion of the total variability (variance) in the dependent variable that can be explained by the independent variables. R-Squared is also employed as a measure of goodness of fit of the model. R-Squared ranges from 0% to 100%. The greater the R-Squared, the better that approximation. If all the observations fall on the regression line, R-Squared is equal to 100%. An R-Squared of 25% means that 25% of variance in the dependent variable can be accounted for by the independent variables you looked at in the multiple regression analysis. This means 75% of variance in the dependent variable is due to other causes. The variability in the dependent variable is partitioned into two component sums of squares: variability explained by the regression model and unexplained variation. To calculate R-Squared, the regression sums of squares is divided by the total sums of squares.

In the example embodiment, sampled asset portfolio 56, which is a representative subset of asset portfolio 12, is valued based on the underwriting process. From the underwriting data collected on each asset included in sample asset portfolio 56, a valuation model is generated. The valuation model is then used to calculate the value of portfolio 12 for bidding purposes. To determine whether stopping criteria 60 has been satisfied, a user may utilize the valuation model to re-value sample asset portfolio 56, and then compare the value of sample asset portfolio 56 based on the underwriting data to the value of sample asset portfolio 56 based on the valuation model to determine whether these values are substantially equal. If these values are substantially equal, then stopping criteria 60 has been satisfied, and the iterative and adaptive valuation process is complete and portfolio 12 can be valued for bidding purposes.

Figure 3:
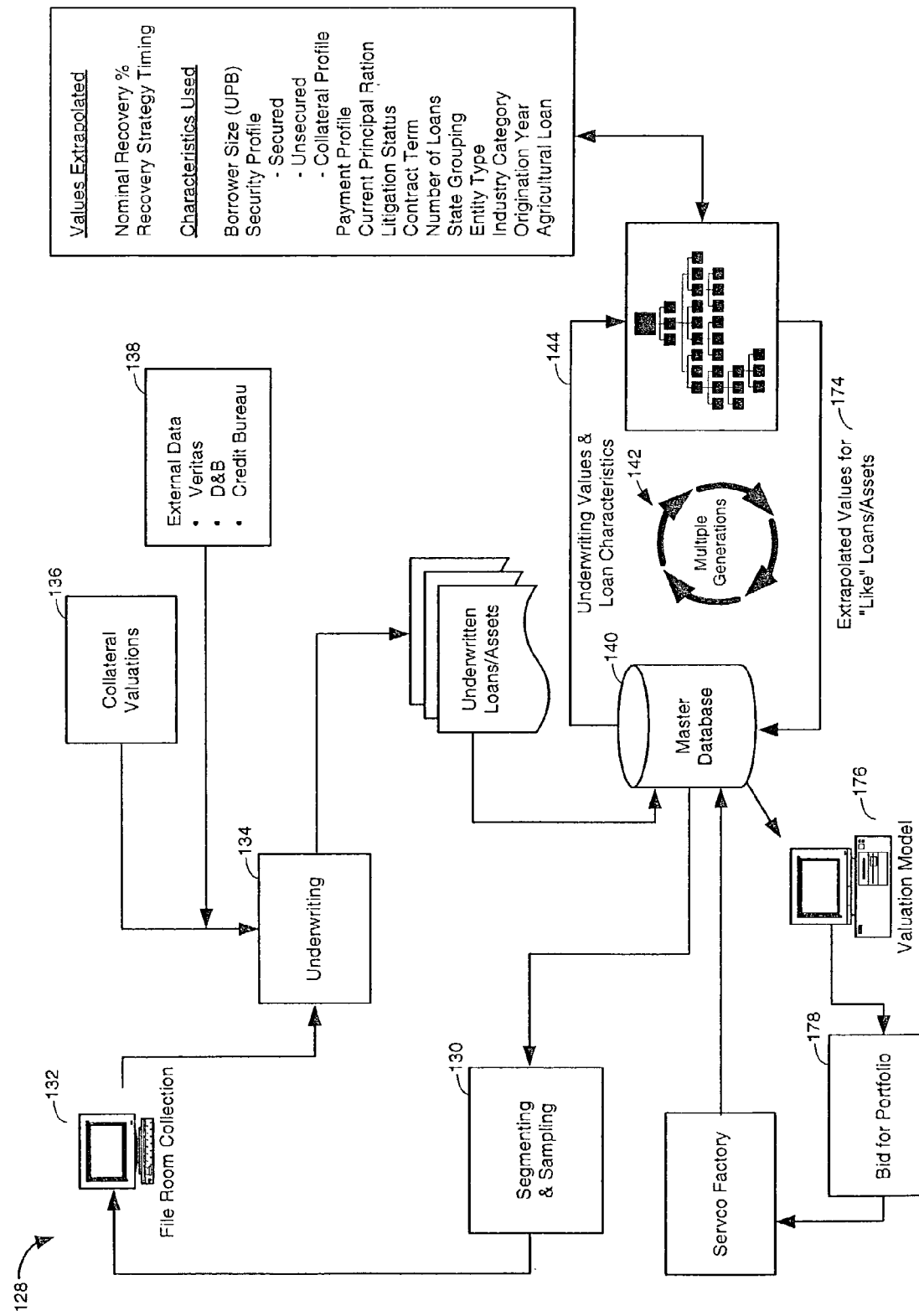
FIG. 3 is a flow diagram illustrating valuing a sampled portfolio of assets in accordance with one embodiment of the present invention.

FIG. 3 is a diagram illustrating one embodiment of a system 128 utilizing a snapshot approach to valuing asset portfolio 12 (shown in FIG. 1). Included in FIG. 3 are representations of process steps taken by system 128 in valuing sampled asset portfolio 56 (shown in FIG. 2). The technical effect produced by system 128 is achieved by first segmenting and sampling 130 assets within an asset portfolio as shown in FIG. 2. Segmenting and sampling 130 is a phased approach that assigns certain basic financial attributes 30 (shown in FIG. 2) to each asset within the asset portfolio. Once each asset within the asset portfolio is assigned financial attributes 30, a table is created illustrating this information for each asset. The asset portfolio then undergoes a segmentation process 52 (shown in FIG. 2) wherein each asset within the asset portfolio is placed in a group or "segment" based on its assigned financial attributes 30. Following segmentation 52, a sampling 54 (shown in FIG. 2) of the assets within the asset portfolio is taken. Sampling 54 includes a representative sample of assets from each segment within the asset portfolio. Sampling 54 includes a selected percentage of the assets within the asset portfolio. Once sampling 54 is completed, the assets selected by sampling 54 are placed in a "sampled" asset portfolio 56, which is a representative subset of the overall asset portfolio.

System 128 individually evaluates ("touches") all assets in sampled portfolio 56. After segmenting and sampling 130, system 128 includes collecting 132 financial and other information relating to each asset within sampled portfolio 56 so that each asset within sampled portfolio 56 may undergo an underwriting process 134. Prior to underwriting process 134, underwriters may also perform valuations 136 on collateral relating to at least one asset within sampled portfolio 56. Collateral valuations 136 enable the underwriters to better evaluate assets within sampled portfolio 56. Additionally, the underwriters may also obtain and utilize external data 138 that relates to at least one asset within sampled portfolio 56, for example, credit bureau information relating to a borrower is oftentimes used (e.g., Veritas; The D&B Corporation, and Credit Bureau Services).

During underwriting process 134, each asset within sampled portfolio 56 undergoes an iterative and adaptive valuation in which the assets in sampled portfolio 56 are individually valued, listed individually in tables and then selected from the tables and grouped into any desired or required groups or tranches for bidding purposes (as described below.) As in diagram 10 (shown in FIG. 1), where underwriters begin a full underwrite 14 (shown in FIG. 1) of individual assets in portfolio 12 (shown in FIG. 1) to produce a fully underwritten first portion 16 (shown in FIG. 1) of assets, in system 128 underwriters begin a full underwrite 134 of individual assets in sampled portfolio 56 to produce a fully underwritten sampled portfolio 56. The information generated through underwriting process 134, including the value of each asset, is referred to as "underwriting data."

After each asset within sampled portfolio 56 is valued through underwriting process 134, the underwriting data is stored in a master database 140. In one embodiment, database 140 is in communication with a database server (not shown in FIG. 3) and a server system (not shown in FIG. 3). Individual asset data for each asset in sampled portfolio 56 is entered into a database 140 from which selected data is retrieved based on a given criteria for an iterative and adaptive process 142. Iterative and adaptive process 142 includes grouping 144 the assets within sampled portfolio 56 based on like underwriting values and asset characteristics. Once grouping 144 is complete, iterative and adaptive process 142 extrapolates 174 values for "like" assets or assets with similar characteristics so that a valuation model 176 (described below) may be generated for use in bidding 178. The values extrapolated may include a nominal recovery percentage, and recovery strategy timing.

In one embodiment, database 140 is connected to a computer (not shown in FIG. 3) that is configured as a stand alone computer. In another embodiment, the computer is configured as a server connected to at least one client system through a network (shown and described in FIG. 4), such as a wide-area network (WAN) or a local-area network (LAN).

In one embodiment, once the groupings of assets is made, the number of samples to be taken and submitted for further underwriting review is calculated by establishing the confidence level with which statements can be made about the total recoveries in each segment (k), establishing the precision with which one wishes to estimate the total recoveries in each segment (h) and providing an a priori estimate of the level and range of recoveries as a percentage of total Unpaid Principal Balance (UPB) (R), according to:

$$\text{Var}(\hat{Y}_R) = n\left[1 - \frac{n}{N}\right] \times \frac{\left[\sum_1^N x_i\right]^2}{\left[\sum_1^n x_i\right]^2} \times \frac{\sum_1^N (y_i - Rx_i)^2}{N-1}$$

n = sample size
N = cluster size
$x_i$ = UPB for sample i
$y_i$ = recovery for sample i $$R = \frac{\sum_1^N y_i}{\sum_1^N x_i} = \text{cluster expected recovery \%}$$

$$h^2 = k^2 \times n\left[1 - \frac{n}{N}\right] \times \frac{\left[\sum_1^N x_i\right]^2}{\left[\sum_1^n x_i\right]^2} \times \frac{\sum_1^N (y_i - Rx_i)^2}{N-1} \quad \text{(Equation A)}$$

$h = $ error tolerance for estimating $Y = \sum_1^N y_i$ with $\hat{Y}_R$ $$\hat{Y}_R = \hat{R} \times \sum_{i=1}^N x_i = \frac{\sum_{i=1}^n y_i}{\sum_{i=1}^n x_i} \times \sum_{i=1}^N x_i = \frac{\sum_{i=1}^n \rho_i x_i}{\sum_{i=1}^n x_i} \times \sum_{i=1}^N x_i \quad \text{(Equation B)}$$

k = constant in Tchebyshev's Formula:

$$\left|\hat{Y}_R - \mu_{\hat{Y}_R}\right| \le k\sqrt{\text{Var}(\hat{Y}_R)} \quad \text{with probability} \ge 1 - \frac{1}{k^2}$$

By solving Equation A for n, the required sample size for the given cluster is obtained. Solving Equation B further allows the user to state, with probability the calculated sample size, n, and associated underwritten values will estimate the total cluster recoveries to within an error of h, assuming that estimates of total segment recoveries are determined using Equation B.

In practice, it is difficult to estimate variability in total recoveries without available data. A spreadsheet tool implements the above by generating data in a Monte Carlo simulation, and guiding the user through an analysis of the results until a favorable sample size is derived.

Table A provides an example output from a study of a group of 20 loans, with estimated (expected) recoveries between 20% and 30% of UPB, and a range of UPB between 1 MM and 2 MM. Eight samples are needed to estimate the total recoveries for the 20 loans to within 10% of actual, with 75% confidence.

TABLE A

Sample Size Spreadsheet Wizard

| Sample Size | Exp Rec | Cume Exp Rec | Cume UPB | Exp Rec % | Residual | N (cluster size) | n (sample size) | Expected Recovery % | |
|---|---|---|---|---|---|---|---|---|---|
| 1 | 779,131 | 779,131 | 2,936,279 | 26.5% | — | 20 | 6 | 27.5% | |
| 2 | 716,951 | 1,496,082 | 5,447,631 | 27.5% | 27,259 | Face Range | ER % Range | Face Value | |
| 3 | 359,327 | 1,855,409 | 6,702,090 | 27.7% | 12,042 | 2,000,000 | 5.0% | 44,160,329 | |
| 4 | 481,798 | 2,337,206 | 8,538,875 | 27.4% | (20,956) | Min Face | Min ER % | Expected Recovery | |
| 5 | 606,774 | 2,943,980 | 10,706,452 | 27.5% | 10,750 | 1,000,000 | 25.0% | 12,123,821 | |
| 6 | 418,899 | 3,362,880 | 12,207,495 | 27.5% | 5,397 | Confidence | k | Precision | Precision % |
| 7 | 622,516 | 3,985,396 | 14,609,180 | 27.3% | (32,665) | 75.% | 2.00 | 1,212,382 | 10% |
| 8 | 594,799 | 4,580,195 | 16,911,278 | 27.1% | (28,694) | | | | |
| 9 | 713,922 | 5,294,117 | 19,440,132 | 27.2% | 25,241 | | | | |
| 10 | 494,230 | 5,788,346 | 21,153,615 | 27.4% | 25,363 | | | | |
| 11 | 735,334 | 6,523,680 | 24,031,814 | 27.1% | (45,983) | | | | |
| 12 | 683,155 | 7,206,835 | 26,387,193 | 27.3% | 39,857 | | | | |
| 13 | 748,413 | 7,955,248 | 29,256,251 | 27.2% | (31,730) | | | | |
| 14 | 419,885 | 8,375,133 | 30,726,773 | 27.3% | 19,068 | | | | |
| 15 | 757,050 | 9,132,183 | 33,682,971 | 27.1% | (44,439) | | | | |
| 16 | 553,674 | 9,685,857 | 35,690,262 | 27.1% | 8,922 | | | | |
| 17 | 761,579 | 10,447,435 | 38,234,459 | 27.3% | 66,386 | | | | |
| 18 | 677,811 | 11,125,246 | 40,756,944 | 27.3% | (10,741) | | | | |
| 19 | 563,811 | 11,689,057 | 42,688,952 | 27.4% | 34,790 | | | | |
| 20 | 434,763 | 12,123,821 | 44,160,329 | 27.5% | 30,810 | | | | |

The appropriate variance adjusted forecast is made for each asset and the valuation tables are constructed to include every asset in the portfolio. The recovery is valued with continuous probabilities at the unit of sale, which in one embodiment is a tranche. In the use of system 28, internal rate of return ("IRR") and variance would then be assessed. Preferred tranches have lower variances for a given IRR. The probability of each tranche's net present value ("NPV") to be above 0 is assessed using the project's discount rate. A discount rate is determined from the opportunity cost of capital, plus FX swap cost, plus risks in general uncertainties inherent in the variances of forecasted cash flow recovery.

"Underwriting" as used herein means a process in which a person ("underwriter") reviews an asset in accordance with established principles and determines expected cash flows, subsequent to purchase, for the asset. During underwriting, the underwriter uses pre-existing or established criteria for the valuations. "Criteria" means rules relevant to asset value and a rating based on such categories. For example, as a criteria, an underwriter might determine three years of cash flow history of the borrower to be a category of information relevant to asset valuation and might give a certain rating to various levels of cash flow.

Figure 4:
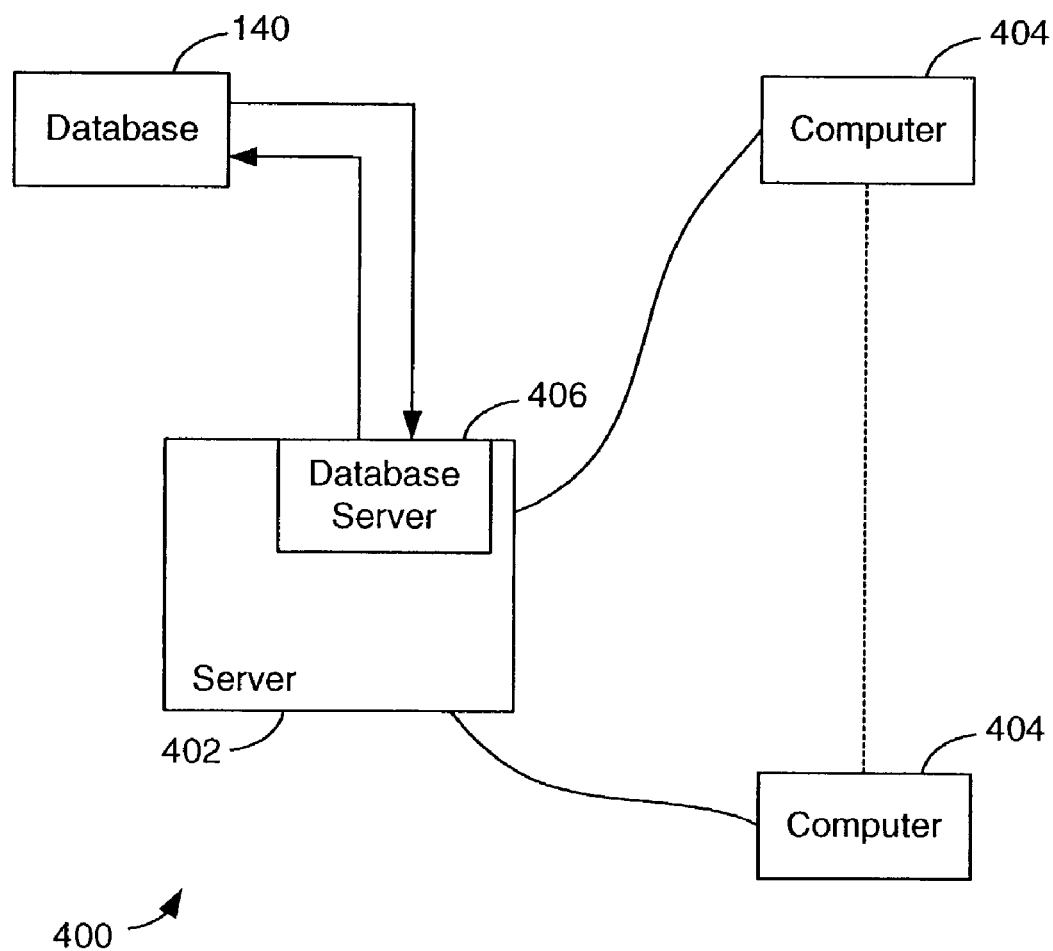
FIG. 4 is a computer network schematic.

FIG. 4 illustrates an exemplary system 400 in accordance with one embodiment of the present invention. System 400 includes at least one computer configured as a server 402 and a plurality of other computers 404 coupled to server 402 to form a network. In one embodiment, computers 404 are client systems including a web browser, and server 402 is accessible to computers 404 via the Internet. In addition, server 402 is a computer. Computers 404 are interconnected to the Internet through many interfaces including a network, such as a local area network (LAN) or a wide area network (WAN), dial-in-connections, cable modems and special high-speed ISDN lines. Computers 404 could be any device capable of interconnecting to the Internet including a web-based phone or other web-based connectable equipment, including wireless web and satellite. Server 402 includes a database server 406 connected to a centralized database 140 (also shown in FIG. 3) which contains data describing sets of asset portfolios. In one embodiment, centralized database 140 is stored on database server 406 and is accessed by users at one of computers 404 by logging onto server sub-system 402 through one of computers 404. In an alternative embodiment centralized database 140 is stored remotely from server 402. Server 402 is further configured to receive and store information for the asset valuation methods described above.

While system 400 is described as a networked system, it is contemplated that the methods and algorithms described herein for examination and manipulation of asset portfolios are capable of being implemented in a stand-alone computer system that is not networked to other computers.

While the invention has been described in terms of various specific embodiments, those skilled in the art will recognize that the invention can be practiced with modification within the spirit and scope of the claims.

What is claimed is:

1. A method for valuing a portfolio of assets having an undetermined value using a snapshot approach system, the snapshot approach system implemented using a computer coupled to a database, the computer configured to perform valuation process analytics, said method comprising:
    assigning a plurality of predetermined financial attributes to each asset included within the portfolio;
    categorizing the assets into a predetermined number of segments based on the assigned financial attributes of each asset;
    selecting a representative sample of assets having an undetermined value from each segment;
    fully underwriting each asset included in the representative asset sample;
    valuing each asset in the representative asset sample based on the underwriting process;
    generating by the computer a valuation model based on the underwriting values and the financial attributes assigned to the assets included within the representative asset sample;
    establishing a stopping criteria that equals a predetermined amount of variance between a predicted value and an underwritten value of the representative asset sample;

determining the predicted value of the representative asset sample by applying the generated valuation model to the assets included within the representative asset sample;

determining the underwritten value of the representative asset sample from the underwriting values of the assets included within the representative asset sample;

calculating a model delta by comparing the predicted value of the representative asset sample to the underwritten value of the representative asset sample;

determining by the computer a predictive accuracy of the generated valuation model by comparing the model delta to the stopping criteria and determining whether the generated valuation model satisfies the stopping criteria;

calculating by the computer a value of the portfolio of assets having an undetermined value for bidding purposes based on the generated valuation model if the stopping criteria is satisfied; and if the stopping criteria is not satisfied, iteratively updating the generated valuation model by fully underwriting additional assets included within the portfolio but not included within the representative sample until the stopping criteria is satisfied.

2. The method according to claim 1 wherein categorizing the assets further comprises categorizing the assets into a predetermined number of segments based on the plurality of predetermined financial attributes of each asset wherein the financial attributes of each asset include at least one of an amount of unpaid principal balance ("UPB"), a collateral type, whether the loan is secured, whether the loan is unsecured, real estate security, non-real estate security, a litigation status, a borrower operational status, and payment behavior.

3. The method according to claim 1 wherein categorizing the assets further comprises:

assigning a plurality of predetermined financial attributes to each asset included within the portfolio wherein the financial attributes include at least one of an amount of unpaid principal balance ("UPB"), a collateral type, whether the loan is secured, whether the loan is unsecured, real estate security, non-real estate security, a litigation status, a borrower operational status, and payment behavior; and categorizing each asset in the portfolio based on the financial attributes assigned to each asset.

4. The method according to claim 1 wherein selecting a representative sample of assets from each segment further comprises selecting a predetermined percentage of unpaid principal balance ("UPB") of the assets.

5. The method according to claim 1 wherein valuing each asset in the representative asset sample further comprises performing an iterative and adaptive valuation in which each asset in the representative asset sample is individually valued.

6. The method according to claim 1 wherein calculating a value of the portfolio further comprises:

categorizing each asset in the representative asset sample based on asset characteristics such that each asset in the representative asset sample is categorized with assets included in the representative asset sample having similar asset characteristics;

determining that the stopping criteria is satisfied; and valuing the portfolio for bidding purposes by comparing the asset characteristics of the assets in the representative asset sample to the assets included within the portfolio but not included within the representative sample and extrapolating the value of the assets included within the portfolio but not included within the representative sample from the value of each asset in the representative asset sample.

7. The method according to claim 6 further comprising storing the underwriting data in a centralized database.

8. The method according to claim 1 wherein fully underwriting each asset included in the representative asset sample further comprises:

collecting financial and business information relating to each asset in the representative asset sample;

performing collateral valuations for at least one asset in the representative asset sample; and utilizing credit bureau information for at least one asset in the representative asset sample.

9. The method according to claim 1 wherein determining a predictive accuracy of the generated valuation model further comprises performing an R-Squared analysis on the generated valuation model to determine the predictive accuracy of the generated valuation model, wherein the R-Squared analysis calculates an amount of variation in the predictive results of the generated valuation model resulting from unknown causes.

10. The method according to claim 6 wherein determining that the stopping criteria is satisfied further comprises:

generating the valuation model for valuing the portfolio for bidding purposes by extrapolating the value of the assets included within the portfolio but not included within the representative sample from the value of the representative asset sample;

utilizing the valuation model to re-value the representative asset sample; and determining whether the value of the representative asset sample based on underwriting data and the value of the representative asset sample based on the valuation model are substantially equal.

11. The method according to claim 1 wherein calculating a value of the portfolio for bidding purposes further comprises:

categorizing each asset in the representative asset sample based on asset characteristics such that each asset in the representative asset sample is categorized with assets having similar asset characteristics;

comparing the asset characteristics of the assets in the representative asset sample to the assets included within the portfolio but not included within the representative sample;

extrapolating the value of the assets included within the portfolio but not included within the representative sample from the value of each asset in the representative asset sample; and calculating a total value of the portfolio based on the extrapolation.

12. A method for valuing a portfolio of assets having an undetermined value using a snapshot approach system, the snapshot approach system implemented using a computer coupled to a database, the computer configured to perform valuation process analytics, said method comprising:

assigning a plurality of predetermined financial attributes to each asset included within the portfolio, the plurality of financial attributes including an amount of unpaid principal balance ("UPB"), a collateral type, whether the loan is secured, whether the loan is unsecured, real estate security, non-real estate security, a litigation status, a borrower operational status, and payment behavior;

categorizing the assets into a predetermined number of segments based on the assigned financial attributes of each asset;

selecting a representative sample of assets having an undetermined value from each segment;

performing by the computer an iterative and adaptive valuation in which each asset in the representative asset sample is individually valued, the iterative and adaptive valuation includes underwriting each asset in the representative asset sample to generate underwriting data, valuing each asset in the representative asset sample based on underwriting data, categorizing each asset in the representative asset sample based on asset characteristics such that each asset in the representative asset sample is categorized with assets included in the representative asset sample having similar asset characteristics, and generating a valuation model based on the underwriting values and asset characteristics of the assets included within the representative asset sample;

establishing a stopping criteria that equals a predetermined amount of variance between a predicted value and an underwritten value of the representative asset sample;

determining the predicted value of the representative asset sample by applying the generated valuation model to the assets included within the representative asset sample;

determining the underwritten value of the representative asset sample from the underwriting values of the assets included within the representative asset sample;

calculating a model delta by comparing the predicted value of the representative asset sample to the underwritten value of the representative asset sample;

determining by the computer a predictive accuracy of the generated valuation model by comparing the model delta to the stopping criteria and determining whether the generated valuation model satisfies the stopping criteria; and valuing by the computer the portfolio of assets having an undetermined value for bidding purposes when the stopping criteria is satisfied by applying the generated valuation model to the portfolio and by comparing the asset characteristics of the assets in the representative asset sample to the assets included within the portfolio but not included within the representative sample.

13. The method according to claim 12 further comprising:
increasing the size of the representative sample of assets when the stopping criteria is not satisfied;

performing an iterative and adaptive valuation in which each asset in the increased representative asset sample is individually valued, the iterative and adaptive valuation includes underwriting each asset in the increased representative asset sample to generate underwriting data, valuing each asset in the increased representative asset sample based on underwriting data, categorizing each asset in the increased representative asset sample based on asset characteristics such that each asset in the increased representative asset sample is categorized with assets included in the increased representative asset sample having similar asset characteristics, and generating an updated valuation model based on the underwriting values and asset characteristics of the assets included within the representative asset sample;

establishing a stopping criteria representing a predetermined amount of variance between an updated predicted value and an updated underwritten value of the increased representative asset sample, wherein the updated predicted value is determined from the generated updated valuation model, and wherein the updated underwritten value is determined from fully underwriting each asset in the increased representative asset sample;

determining a predictive accuracy of the generated updated valuation model including determining whether the generated valuation model satisfies the stopping criteria; and valuing the portfolio of assets having an undetermined value for bidding purposes when the stopping criteria is satisfied by applying the generated valuation model to the portfolio and by comparing the asset characteristics of the assets in the increased representative asset sample to the assets included within the portfolio but not included within the representative sample.

14. A portfolio valuation system for snapshot valuation of a portfolio of assets having an undetermined value, said system comprising:

a centralized database for storing information relating to the portfolio of assets having an undetermined value;

a server system coupled to said database and configured to perform valuation process analytics; and at least one client system connected to said server system through a network, said server further configured to:
assign a plurality of predetermined financial attributes to each asset included within the portfolio;

categorize the assets into a predetermined number of segments based on the assigned financial attributes of each asset;

select a representative sample of assets having an undetermined value from each segment;

prompt a user to fully underwrite each asset included in the representative asset sample;

value each asset in said representative asset sample based on the underwriting process;

generate a valuation model based on the underwriting values and the financial attributes assigned to the assets included within the representative asset sample;

establish a stopping criteria that equals a predetermined amount of variance between a predicted value and an underwritten value of the representative asset sample;

determine the predicted value of the representative asset sample by applying the generated valuation model to the assets included within the representative asset sample;

determine the underwritten value of the representative asset sample from the underwriting values of the assets included within the representative asset sample;

calculate a model delta by comparing the predicted value of the representative asset sample to the underwritten value of the representative asset sample;

determine a predictive accuracy of the generated valuation model by comparing the model delta to the stopping criteria and determining whether the generated valuation model satisfies the stopping criteria;

calculate a value of the portfolio of assets having an undetermined value for bidding purposes based on the generated valuation model if the stopping criteria is satisfied; and if the stopping criteria is not satisfied, iteratively update the generated valuation model by fully underwriting additional assets included within the portfolio but not included within the representative sample until the stopping criteria is satisfied.

15. The system according to claim 14 wherein said server is further configured to categorize the assets into a predetermined number of segments based on the plurality of predetermined financial attributes of each asset wherein said financial attributes of each asset include at least one of an amount of unpaid principal balance ("UPB"), a collateral type, whether the loan is secured, whether the loan is unsecured, real estate security, non-real estate security, a litigation status, a borrower operational status, and payment behavior.

16. The system according to claim 14 wherein said server is further configured to:
assign a plurality of predetermined financial attributes to each asset in said portfolio wherein said financial attributes include at least one of an amount of unpaid principal balance ("UPB"), a collateral type, whether the loan is secured, whether the loan is unsecured, real estate security, non-real estate security, a litigation status, a borrower operational status, and payment behavior; and
categorize each asset in said portfolio based on said financial attributes assigned to each asset.

17. The system according to claim 14 wherein said server is further configured to select a representative sample of assets from each segment based on a predetermined percentage of unpaid principal balance ("UPB") of said assets.

18. The system according to claim 14 wherein said server is further configured to perform an iterative and adaptive valuation in which each asset in said representative asset sample is individually valued.

19. The system according to claim 14 wherein said server is further configured to:
categorize each asset in said representative asset sample based on asset characteristics such that each asset in said representative asset sample is categorized with assets in said representative asset sample having similar asset characteristics;
determine that the a stopping criteria is satisfied; and
value said portfolio for bidding purposes by comparing said asset characteristics of said assets in said representative asset sample to said assets included within said portfolio but not included within said representative sample and extrapolating the value of said assets included within said portfolio but not included within said representative sample from the value of each asset in said representative asset sample.

20. The system according to claim 19 wherein said server is further configured to store said underwriting data in said centralized database.

21. The system according to claim 19 wherein said server is further configured to fully underwrite each asset included in said representative asset sample by:
collecting financial and business information relating to each asset in said representative asset sample;
performing collateral valuations for at least one asset in said representative asset sample; and
utilizing credit bureau information for at least one asset in said representative asset sample.

22. The system according to claim 14 wherein said server is further configured to perform an R-Squared analysis on the generated valuation model to determine the predictive accuracy of the generated valuation model, wherein the R-Squared analysis calculates an amount of variation in the predictive results of the generated valuation model resulting from unknown causes.

23. The system according to claim 19 wherein said server is further configured to apply a stopping criteria by:
generating the valuation model for valuing said portfolio for bidding purposes by extrapolating the value of said assets included within said portfolio but not included within said representative sample from the value of said representative asset sample;
utilizing said valuation model to re-value said representative asset sample; and
determining whether the value of said representative asset sample based on said underwriting data and the value of said representative asset sample based on said valuation model are substantially equal.

24. The system according to claim 14 wherein said server is further configured to calculate a value of said assets for bidding purposes by:
categorizing each asset in said representative asset sample based on asset characteristics such that each asset in said representative asset sample is categorized with assets having similar asset characteristics;
comparing the asset characteristics of the assets in said representative asset sample to said assets included within said portfolio but not included within said representative sample;
extrapolating the value of said assets included within said portfolio but not included within said representative sample from the value of each asset in said representative asset sample; and
calculating a total value of said portfolio based on said extrapolation.

25. A portfolio valuation system for snapshot valuation of a portfolio of assets having an undetermined value, said system comprising:
a centralized database for storing information relating to the portfolio of assets having an undetermined value;
a server system coupled to said database and configured to perform valuation process analytics; and
at least one client system connected to said server system through a network, said server further configured to:
assign a plurality of predetermined financial attributes to each asset included within the portfolio, the plurality of financial attributes including an amount of unpaid principal balance ("UPB"), a collateral type, whether the loan is secured, whether the loan is unsecured, real estate security, non-real estate security, a litigation status, a borrower operational status, and payment behavior;
categorize the assets into a predetermined number of segments based on the assigned financial attributes of each asset;
select a representative sample of assets from each segment;
perform an iterative and adaptive valuation in which each asset in said representative asset sample is individually valued, said iterative and adaptive valuation comprises underwriting each asset in said representative asset sample to generate underwriting data, valuing each asset in said representative asset sample based on underwriting data, categorizing each asset in said representative asset sample based on asset characteristics such that each asset in said representative asset sample is categorized with assets included in said representative asset sample having similar asset characteristics, and generating a valuation model based on the underwriting values and asset characteristics of the assets included within the representative asset sample;
establish a stopping criteria that equals a predetermined amount of variance between a predicted value and an underwritten value of the representative asset sample;
determine the predicted value of the representative asset sample by applying the generated valuation model to the assets included within the representative asset sample;

determine the underwritten value of the representative asset sample from the underwriting values of the assets included within the representative asset sample;

calculate a model delta by comparing the predicted value of the representative asset sample to the underwritten value of the representative asset sample;

determine a predictive accuracy of the generated valuation model by comparing the model delta to the stopping criteria and determining whether the generated valuation model satisfies the stopping criteria; and value said portfolio of assets having an undetermined value for bidding purposes when said stopping criteria is satisfied by applying the generated valuation model to the portfolio and by comparing asset characteristics of the assets in said representative asset sample to said assets included within said portfolio but not included within said representative sample.

26. The system according to claim 25 wherein said server is further configured to:

increase the size of the representative sample of assets when said stopping criteria is not satisfied;

perform an iterative and adaptive valuation in which each asset in said increased representative asset sample is individually valued, said iterative and adaptive valuation comprises underwriting each asset in said increased representative asset sample to generate underwriting data, valuing each asset in said increased representative asset sample based on underwriting data, categorizing each asset in said increased representative asset sample based on asset characteristics such that each asset in said increased representative asset sample is categorized with assets included in said increased representative asset sample having similar asset characteristics, and generating an updated valuation model based on the underwriting values and asset characteristics of the assets included within the representative asset sample;

establish a stopping criteria representing a predetermined amount of variance between an updated predicted value and an updated underwritten value of the increased representative asset sample, wherein the updated predicted value is determined from the generated updated valuation model, and wherein the updated underwritten value is determined from fully underwriting each asset in the increased representative asset sample;

determine a predictive accuracy of the updated generated valuation model including determining whether the generated valuation model satisfies the stopping criteria; and value said portfolio of assets having an undetermined value for bidding purposes when said stopping criteria is satisfied by applying the generated valuation model to the portfolio and by comparing asset characteristics of the assets in said increased representative asset sample to said assets included within said portfolio but not included within said representative sample.

27. A system for snapshot valuation of a portfolio of assets having an undetermined value, said system comprising a computer including a database of the portfolio and configured to enable valuation process analytics, said computer configured to:

assign a plurality of predetermined financial attributes to each asset included within a portfolio;

categorize the assets into a predetermined number of segments based on the assigned financial attributes of each asset;

select a representative sample of assets having an undetermined value from each segment;

prompt a user to fully underwrite each asset included in the representative asset sample;

value each asset in said representative asset sample based on the underwriting process;

generate a valuation model based on the underwriting values and the financial attributes assigned to the assets included within the representative asset sample;

establish a stopping criteria that equals a predetermined amount of variance between a predicted value and an underwritten value of the representative asset sample;

determine the predicted value of the representative asset sample by applying the generated valuation model to the assets included within the representative asset sample;

determine the underwritten value of the representative asset sample from the underwriting values of the assets included within the representative asset sample;

calculate a model delta by comparing the predicted value of the representative asset sample to the underwritten value of the representative asset sample;

determine a predictive accuracy of the generated valuation model by comparing the model delta to the stopping criteria and determining whether the generated valuation model satisfies the stopping criteria;

calculate a value of the portfolio of assets having an undetermined value for bidding purposes based on the generated valuation model if the stopping criteria is satisfied; and if the stopping criteria is not satisfied, iteratively update the generated valuation model by fully underwriting additional assets included within the portfolio but not included within the representative sample until the stopping criteria is satisfied.

28. The system according to claim 27 wherein said computer is configured to categorize the assets into a predetermined number of segments based on the plurality of predetermined financial attributes of each asset wherein said financial attributes of each asset include at least one of an amount of unpaid principal balance ("UPB"), a collateral type, whether the loan is secured, whether the loan is unsecured, real estate security, non-real estate security, a litigation status, a borrower operational status, and payment behavior.

29. The system according to claim 27 wherein said computer is configured to categorize the assets by:

assigning a plurality of predetermined financial attributes to each asset in said portfolio wherein said financial attributes include at least one of an amount of unpaid principal balance ("UPB"), a collateral type, whether the loan is secured, whether the loan is unsecured, real estate security, non-real estate security, a litigation status, a borrower operational status, and payment behavior; and categorizing each asset in said portfolio based on said financial attributes assigned to each portfolio asset.

30. The system according to claim 27 wherein said computer is configured to select a representative sample of assets from each segment based on a predetermined percentage of unpaid principal balance ("UPB") of said assets.

31. The system according to claim 27 wherein said computer is configured to perform an iterative and adaptive valuation in which each asset in said representative asset sample is individually valued.

32. The system according to claim 27 wherein said computer is configured to:

categorize each asset in said representative asset sample based on asset characteristics such that each asset in said representative asset sample is categorized with assets having similar asset characteristics;

determine that the stopping criteria is satisfied; and value said portfolio for bidding purposes by comparing said asset characteristics of said assets in said representative asset sample to said assets included within said portfolio but not included within said representative sample and extrapolating the value of said assets included within said portfolio but not included within said representative sample from the value of each asset in said representative asset sample.

33. The system according to claim 32 wherein said computer is configured to store said underwriting data in a centralized database.

34. The system according to claim 27 wherein said computer is configured to prompt a user to fully underwrite each asset included in said representative asset sample by:

collecting financial and business information relating to each asset in said representative asset sample;

performing collateral valuations for at least one asset in said representative asset sample; and utilizing credit bureau information for at least one asset in said representative asset sample.

35. The system according to claim 27 wherein said computer is configured to perform an R-Squared analysis on the generated valuation model to determine the predictive accuracy of the generated valuation model, wherein the R-Squared analysis calculates an amount of variation in the predictive results of the generated valuation model resulting from unknown causes.

36. The system according to claim 32 wherein said computer is configured to apply a stopping criteria by:

generating the valuation model for valuing said portfolio for bidding purposes by extrapolating the value of said assets included within said portfolio but not included within said representative sample from the value of said representative asset sample;

utilizing said valuation model to re-value said representative asset sample; and determining whether the value of said representative asset sample based on said underwriting data and the value of said representative asset sample based on said valuation model are substantially equal.

37. The system according to claim 27 wherein said computer is configured to calculate a value of said portfolio for bidding purposes by:

segmenting each asset in said representative asset sample based on asset characteristics such that each asset in said representative asset sample is categorized with assets having similar asset characteristics;

comparing the asset characteristics of the assets in said representative asset sample to said assets included within said portfolio but not included within said representative sample;

extrapolating the value of said assets included within said portfolio but not included within said representative sample from the value of each asset in said representative asset sample; and calculating a total value of said portfolio based on said extrapolation.

38. A system for snapshot valuation of a portfolio of assets having an undetermined value, said system comprising a computer including a database of the portfolio and configured to enable valuation process analytics, said computer configured to:

assign a plurality of predetermined financial attributes to each asset included within a portfolio, the plurality of financial attributes including an amount of unpaid principle balance ("UPB"), a collateral type, whether the loan is secured, whether the loan is unsecured, real estate security, non-real estate security, a litigation status, a borrower operational status, and payment behavior;

categorize the assets into a predetermined number of segments based on the assigned financial attributes of each asset;

select a representative sample of assets having an undetermined value from each segment;

perform an iterative and adaptive valuation in which each asset in said representative asset sample is individually valued, said iterative and adaptive valuation comprises underwriting each asset in said representative asset sample to generate underwriting data, valuing each asset in said representative asset sample based on underwriting data, segmenting each asset in said representative asset sample based on asset characteristics such that each asset in said representative asset sample is categorized with assets included in said representative asset sample having similar asset characteristics, and generating a valuation model based on the underwriting values and asset characteristics of the assets included within the representative asset sample;

establish a stopping criteria that equals a predetermined amount of variance between a predicted value and an underwritten value of the representative asset sample;

determine the predicted value of the representative asset sample by applying the generated valuation model to the assets included within the representative asset sample;

determine the underwritten value of the representative asset sample from the underwriting values of the assets included within the representative asset sample;

calculate a model delta by comparing the predicted value of the representative asset sample to the underwritten value of the representative asset sample;

determine a predictive accuracy of the generated valuation model by comparing the model delta to the stopping criteria and determining whether the generated valuation model satisfies the stopping criteria; and value said portfolio of assets having an undetermined value for bidding purposes when said stopping criteria is satisfied by applying the generated valuation model to the portfolio and by comparing asset characteristics of the assets in said representative asset sample to said assets included within said portfolio but not included within said representative sample.

39. The system according to claim 38 wherein said computer is configured to:

increase the size of the representative sample of assets when said stopping criteria is not satisfied;

perform an iterative and adaptive valuation in which each asset in said increased representative asset sample is individually valued, said iterative and adaptive valuation comprises underwriting each asset in said increased representative asset sample to generate underwriting data, valuing each asset in said increased representative asset sample based on underwriting data, categorizing each asset in said increased representative asset sample based on asset characteristics such that each asset in said increased representative asset sample is categorized with assets included in said increased representative asset sample having similar asset characteristics, and generating an updated valuation model based on the underwriting values and asset characteristics of the assets included within the representative asset sample;

establish a stopping criteria representing a predetermined amount of variance between an updated predicted value and an updated underwritten value of the increased representative asset sample, wherein the updated predicted value is determined from the generated updated valuation model, and wherein the updated underwritten value is determined from fully underwriting each asset in the increased representative asset sample;

determine a predictive accuracy of the generated updated valuation model including determining whether the generated valuation model satisfies the stopping criteria; and value said portfolio of assets having an undetermined value for bidding purposes when said stopping criteria is satisfied by applying the generated valuation model to the portfolio and by comparing asset characteristics of the assets in said increased representative asset sample to said assets included within said portfolio but not included within said representative sample.

40. A non-transitory computer readable medium comprising a computer program embodied thereon for performing snapshot valuation of a portfolio of assets having an undetermined value, said computer program comprising computer code stored on the computer readable medium and executable by a computer system that:

assigns a plurality of predetermined financial attributes to each asset included within the portfolio;

categorizes the assets into a predetermined number of segments based on the assigned financial attributes of each asset;

selects a representative sample of assets having an undetermined value from each segment;

prompts a user to fully underwrite each asset included in the representative asset sample;

values each asset in said representative asset sample based on the underwriting process;

generates a valuation model based on the underwriting values and the financial attributes assigned to the assets included within the representative asset sample;

establishes a stopping criteria that equals a predetermined amount of variance between a predicted value and an underwritten value of the representative asset sample;

determines the predicted value of the representative asset sample by applying the generated valuation model to the assets included within the representative asset sample;

determines the underwritten value of the representative asset sample from the underwriting values of the assets included within the representative asset sample;

calculates a model delta by comparing the predicted value of the representative asset sample to the underwritten value of the representative asset sample;

determines a predictive accuracy of the generated valuation model by comparing the model delta to the stopping criteria and determining whether the generated valuation model satisfies the stopping criteria;

calculates a value of the portfolio of assets having an undetermined value for bidding purposes based on the generated valuation model if the stopping criteria is satisfied; and if the stopping criteria is not satisfied, iteratively updates the generated valuation model by fully underwriting additional assets included within the portfolio but not included within the representative sample until the stopping criteria is satisfied.

41. The non-transitory computer readable medium according to claim 40 wherein said computer program further comprises computer code that categorizes the assets into a predetermined number of segments based on the plurality of predetermined financial attributes of each asset wherein said financial attributes of each asset include at least one of an amount of unpaid principal balance ("UPB"), a collateral type, whether the loan is secured, whether the loan is unsecured, real estate security, non-real estate security, a litigation status, a borrower operational status, and payment behavior.

42. The non-transitory computer readable medium according to claim 40 wherein said computer program further comprises computer code that categorizes the assets by:

assigning a plurality of predetermined financial attributes to each asset in said portfolio wherein said financial attributes include at least one of an amount of unpaid principal balance ("UPB"), a collateral type, whether the loan is secured, whether the loan is unsecured, real estate security, non-real estate security, a litigation status, a borrower operational status, and payment behavior; and categorizing each asset in said portfolio based on said financial attributes assigned to each asset.

43. The non-transitory computer readable medium according to claim 40 wherein said computer program further comprises computer code that selects a representative sample of assets from each segment based on a predetermined percentage of unpaid principal balance ("UPB") of said assets.

44. The non-transitory computer readable medium according to claim 40 wherein said computer program further comprises computer code that performs an iterative and adaptive valuation in which each asset in said representative asset sample is individually valued.

45. The non-transitory computer readable medium according to claim 40 wherein said computer program further comprises computer code that:

categorizes each asset in said representative asset sample based on asset characteristics such that each asset in said representative asset sample is categorized with assets having similar asset characteristics;

determines that the stopping criteria is satisfied; and valuing said portfolio for bidding purposes by comparing said asset characteristics of said assets in said representative asset sample to said assets included within said portfolio but not included within said representative sample and extrapolating the value of said assets included within said portfolio but not included within said representative sample from the value of each asset in said representative asset sample.

46. The non-transitory computer readable medium according to claim 45 wherein said computer program further comprises computer code that stores said underwriting data in a centralized database.

47. The non-transitory computer readable medium according to claim 40 wherein said computer program further comprises computer code that fully underwrites each asset included in said representative asset sample by:

collecting financial and business information relating to each asset in said representative asset sample;

performing collateral valuations for at least one asset in said representative asset sample; and utilizing credit bureau information for at least one asset in said representative asset sample.

48. The non-transitory computer readable medium according to claim 40 wherein said computer program further comprises computer code that performs an R-Squared analysis on the generated valuation model to determine the predictive accuracy of the generated valuation model, wherein the R-Squared analysis calculates an amount of variation in the predictive results of the generated valuation model resulting from unknown causes.

49. The non-transitory computer readable medium according to claim 45 wherein said computer program further comprises computer code that applies a stopping criteria by:
  generating the valuation model for valuing said portfolio for bidding purposes by extrapolating the value of said assets included within said portfolio but not included within said representative sample from the value of said representative asset sample;
  utilizing said valuation model to re-value said representative asset sample; and
  determining whether the value of said representative asset sample based on said underwriting data and the value of said representative asset sample based on said valuation model are substantially equal.

50. The non-transitory computer readable medium according to claim 40 wherein said computer program further comprises computer code that calculates a value of said portfolio for bidding purposes by:
  categorizing each asset in said representative asset sample based on asset characteristics such that each asset in said representative asset sample is categorized with assets having similar asset characteristics;
  comparing the asset characteristics of the assets in said representative asset sample to said assets included within said portfolio but not included within said representative sample;
  extrapolating the value of said assets included within said portfolio but not included within said representative sample from the value of each asset in said representative asset sample; and
  calculating a total value of said portfolio based on said extrapolation.

51. A non-transitory computer readable medium comprising a computer program embodied thereon for performing snapshot valuation of a portfolio of assets having an undetermined value, said computer program comprising computer code stored on the computer readable medium and executable by a computer system that:
  assigns a plurality of predetermined financial attributes to each asset included within the portfolio, the plurality of financial attributes including an amount of unpaid principal balance ("UPB"), a collateral type, whether the loan is secured, whether the loan is unsecured, real estate security, non-real estate security, a litigation status, a borrower operational status, and payment behavior;
  categorizes the assets into a predetermined number of segments based on the assigned financial attributes of each asset;
  selects a representative sample of assets having an undetermined value from each segment;
  performs an iterative and adaptive valuation in which each asset in said representative asset sample is individually valued, said iterative and adaptive valuation comprises underwriting each asset in said representative asset sample to generate underwriting data, valuing each asset in said representative asset sample based on underwriting data, categorizing each asset in said representative asset sample based on asset characteristics such that each asset in said representative asset sample is categorized with assets included in said representative asset sample having similar asset characteristics, and generating a valuation model based on the underwriting values and asset characteristics of the assets included within the representative asset sample;
  establishes a stopping criteria that equals a predetermined amount of variance between a predicted value and an underwritten value of the representative asset sample;
  determines the predicted value of the representative asset sample by applying the generated valuation model to the assets included within the representative asset sample;
  determines the underwritten value of the representative asset sample from the underwriting values of the assets included within the representative asset sample;
  calculates a model delta by comparing the predicted value of the representative asset sample to the underwritten value of the representative asset sample;
  determines a predictive accuracy of the generated valuation model by comparing the model delta to the stopping criteria and determining whether the generated valuation model satisfies the stopping criteria; and
  values said portfolio of assets having an undetermined value for bidding purposes when said stopping criteria is satisfied by applying the generated valuation model to the portfolio and by comparing asset characteristics of the assets in said representative asset sample to said assets included within said portfolio but not included within said representative sample.

52. The non-transitory computer readable medium according to claim 51 wherein said computer program further comprises computer code that:
  increases the size of the representative sample of assets when said stopping criteria is not satisfied;
  performs an iterative and adaptive valuation in which each asset in said increased representative asset sample is individually valued, said iterative and adaptive valuation comprises underwriting each asset in said increased representative asset sample to generate underwriting data, valuing each asset in said increased representative asset sample based on underwriting data, categorizing each asset in said increased representative asset sample based on asset characteristics such that each asset in said increased representative asset sample is categorized with assets included in said increased representative asset sample having similar asset characteristics, and generating an updated valuation model based on the underwriting values and asset characteristics of the assets included within the representative asset sample;
  establishes a stopping criteria representing a predetermined amount of variance between an updated predicted value and an updated underwritten value of the increased representative asset sample, wherein the updated predicted value is determined from the generated updated valuation model, and wherein the updated underwritten value is determined from fully underwriting each asset in the increased representative asset sample;
  determines a predictive accuracy of the generated updated valuation model including determining whether the generated valuation model satisfies the stopping criteria; and
  values said portfolio of assets having an undetermined value for bidding purposes when said stopping criteria is satisfied by applying the generated valuation model to the portfolio and by comparing asset characteristics of the assets in said increased representative asset sample to said assets included within said portfolio but not included within said representative sample.

* * * * *